M. B. Stafford,

Sash Fastener.

No. 2,568. Reissued Apr. 16, 1867.

Witnesses:
W. S. Partridge
Daniel Robertson

Inventor
M. B. Stafford

AM. PHOTO-LITHO. CO. N. Y. (OSBORNE'S PROCESS.)

United States Patent Office.

M. B. STAFFORD, OF NEW YORK, N. Y.

*Letters Patent No.* 37,528, *dated January* 27, 1863; *reissue No.* 2,568, *dated April* 16, 1867.

IMPROVED WINDOW-SASH FASTENING.

The Schedule referred to in these Letters Patent and making part of the same.

TO ALL WHOM IT MAY CONCERN:

Be it known that I, M. B. STAFFORD, of the city, county, and State of New York, have invented a new and improved Window-Sash Fastening; and I do hereby declare that the following is a full, clear, and exact description of the same, reference being had to the accompanying drawings, making a part of this specification, in which—

Figure 1:
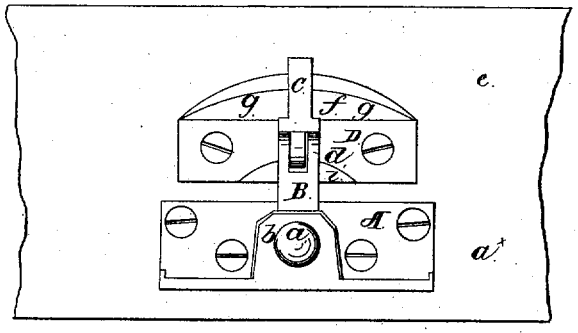

Figure 1 is a plan or top view of my invention in a locked state.

Figure 2:
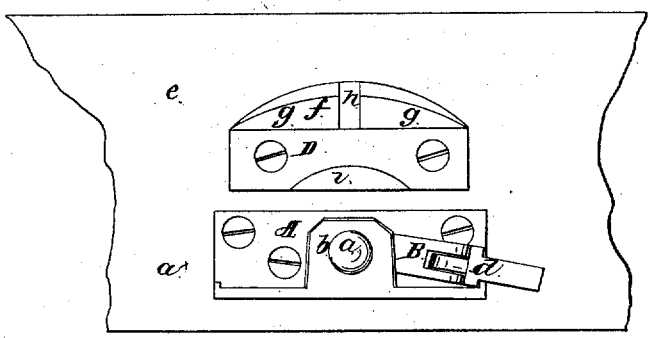

Figure 2, a plan or top view of the same is an unlocked state.

Figure 3:
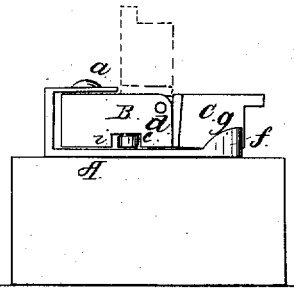

Figure 3, a side view of the same.

Similar letters of reference indicate corresponding parts in the several figures.

This invention relates to an improvement in that class of window-sash fastenings which are designed for keeping the upper and lower sashes in a locked state when closed; and consists in a novel attachment constructed and arranged in such a manner with a fastening that when the latter is moved or adjusted so as to fasten the sashes, the attachment will become engaged, or so adjust itself as to form a lock, and effectually prevent the fastening being operated upon from the outside of the window.

To enable those skilled in the art to fully understand and construct my invention, I will proceed to describe it.

A represents a metal plate or bearing, which is of right-angular form in its transverse section, and is attached by screws to the centre of the lower rail $a^{\times}$ of the upper sash of the window. B is a horizontal fastening bar, composed of two pieces, $b'$ $b''$, jointed together. One end of the bar B is secured by a vertical pin or pivot, $a$, to the plate A. This pin or pivot, $a$, passes through a horizontal plate, $b$, which is at the central part of the plate A, and is parallel with the lower part of the latter, as shown in fig. 3. The bar B is allowed to turn freely on the pin or pivot $a$, and it has a notch or projection, $c$, made in its under side, which is also shown in fig. 3. The outer end $b'$ of the bar B is attached by a pivot or joint, $d$, to the inner end $b''$. The part $b'$ is allowed to work or move freely up and down on said pivot or joint. D is a fastening plate, which is attached to the centre of the upper cross-rail $e$ of the lower sash of the window. This plate D has a recessed ledge, $f$, at its outer end. The front or outer edge of this ledge is curved so as to form a segment or part of a circle, of which the pin or pivot $a$ is the centre. The upper surface of ledge $f$ is also inclined or curved from its centre downward in each direction, so as to form curved inclined surfaces $g$ $g$, and at the centre of said ledge there is a vertical slot or recess, $h$, of sufficient width to receive the lower part of the fastening bar B, (see fig. 2.) On the back part of the plate D, extending across a horizontal line drawn through the recess $h$, there is a ledge, $i$, the front edge of which is curved, forming a segment or part of a circle, the centre of which is the pin or pivot $a$. When the two sashes are not secured or locked in a closed state by the invention, the fastening bar B is turned round, so as to have a longitudinal position on the plate A, as shown in fig. 2, and in order to secure the sashes in a closed state the bar B is moved around at right angles to the plate A, and during this movement of bar B the end thereof, $b'$, turns on its pivot $d$, and passes up one of the inclined surfaces $g$ of the plate D, and when said bar reaches the recess $h$, the said fastening bar B drops into said recess and forms a lock which effectually prevents the bar B being pushed aside or unlocked from the outer side of the window by the insertion of a knife-blade or a thin strip of metal between the adjoining cross-rails $a^{\times}$ $e$ of the two sashes. This is the mode practised by burglars in opening the old fastenings of this kind. But if it were not for the presence of the ledge $i$ and the projection $c$, used in conjunction with the recess $h$, the window would not be locked weather-proof. When the bar B is turned over the plate D, the two cross-rails $a^{\times}$ $e$ are drawn together in close contact, so as to form a weather-proof joint, in consequence of the ledge $i$ fitting against the notch or projection $c$ upon the under side of the bar B. In order to unlock the bar B, the end $b'$ is first raised out of the slot $h$, and the bar B may then be turned either to the right or left over the plate A.

Having thus described my invention, what I claim as new, and desire to secure by Letters Patent, is—

1. The combination in the window-fastener of the fastening-bar B and recessed ledge $f$, substantially as herein shown and described.

2. The combination in the window-fastener of the recessed ledge $f$, with a ledge $i$, and fastening-bar B, substantially as herein shown and described.

3. The employment in the window-fastener of the divided fastening-bar, constructed substantially as herein shown and described.

M. B. STAFFORD.

Witnesses:

WM. F. MCNAMARA,

ALEX. F. ROBERTS.